US012770856B2

(12) United States Patent
Hong et al.

(10) Patent No.: US 12,770,856 B2
(45) Date of Patent: Oct. 20, 2026

(54) APPARATUS AND METHOD FOR MANUFACTURING POSITIVE ELECTRODE, AND LITHIUM SECONDARY BATTERY COMPRISING THE POSITIVE ELECTRODE

(71) Applicant: LG Energy Solution, Ltd., Seoul (KR)

(72) Inventors: Kyungsik Hong, Daejeon (KR); Minsu Kim, Daejeon (KR); Dongseok Shin, Daejeon (KR)

(73) Assignee: LG Energy Solution, Ltd., Seoul (KR)

(*) Notice: Subject to any disclaimer, the term of this patent is extended or adjusted under 35 U.S.C. 154(b) by 574 days.

(21) Appl. No.: 18/281,515

(22) PCT Filed: Nov. 28, 2022

(86) PCT No.: PCT/KR2022/018935
§ 371 (c)(1),
(2) Date: Sep. 11, 2023

(87) PCT Pub. No.: WO2023/113296
PCT Pub. Date: Jun. 22, 2023

(65) Prior Publication Data

US 2024/0154082 A1 May 9, 2024

(30) Foreign Application Priority Data

Dec. 16, 2021 (KR) ........................ 10-2021-0181006

(51) Int. Cl.
*H01M 4/04* (2006.01)
*H01M 4/583* (2010.01)
(Continued)

(52) U.S. Cl.
CPC ......... *H01M 4/0404* (2013.01); *H01M 4/043* (2013.01); *H01M 4/583* (2013.01); *H01M 4/623* (2013.01); *H01M 2004/028* (2013.01)

(58) Field of Classification Search
CPC .... H01M 4/0404; H01M 4/043; H01M 4/583; H01M 4/623; H01M 2004/028
(Continued)

(56) References Cited

U.S. PATENT DOCUMENTS

| | | | |
|---|---|---|---|
| 4,833,048 | A | 5/1989 | Dejonghe et al. |
| 6,610,445 | B1 | 8/2003 | Moriwaki et al. |

(Continued)

FOREIGN PATENT DOCUMENTS

| | | |
|---|---|---|
| CN | 109873120 A | 6/2019 |
| CN | 209393991 U | 9/2019 |

(Continued)

OTHER PUBLICATIONS

Caitlin Dillard et al., "Binder-free, freestanding cathodes fabricated with an ultra-rapid diffusion of sulfur into carbon hanofiber mat for lithium-sulfur batteries", Materials Today Energy, 9 (2018) 336-344.

*Primary Examiner* — James M Erwin
(74) *Attorney, Agent, or Firm* — Bryan Cave Leighton Paisner LLP

(57) ABSTRACT

An apparatus and a method for manufacturing a positive electrode for a lithium secondary battery are provided. The apparatus and the method provide effectively controlled loading amount and porosity of the positive electrode by manufacturing the positive electrode using a dry process including a step of feeding a positive electrode material in the form of a powder and a step of pressurizing the same, where the step of feeding the positive electrode material in the form of a powder and the step of pressurizing the same are performed independently.

10 Claims, 1 Drawing Sheet

(51) Int. Cl.
*H01M 4/62* (2006.01)
*H01M 4/02* (2006.01)

(58) Field of Classification Search
USPC ........................................................ 429/231.8
See application file for complete search history.

(56) References Cited

U.S. PATENT DOCUMENTS

| | | | | |
|---|---|---|---|---|
| 2001/0051300 | A1 | 12/2001 | Moriguchi et al. | |
| 2006/0153972 | A1* | 7/2006 | Hirokawa | H01M 4/04 427/79 |
| 2007/0259268 | A1* | 11/2007 | Drews | H01M 10/0525 252/182.1 |
| 2013/0119321 | A1 | 5/2013 | Lettow | |
| 2014/0023922 | A1 | 1/2014 | Isshiki et al. | |
| 2014/0079872 | A1 | 3/2014 | Uchida et al. | |
| 2014/0099538 | A1 | 4/2014 | Johnson et al. | |
| 2015/0010825 | A1 | 1/2015 | Yang et al. | |
| 2015/0340688 | A1 | 11/2015 | Rhee et al. | |
| 2015/0340696 | A1* | 11/2015 | Son | H01M 4/58 429/188 |
| 2016/0181651 | A1 | 6/2016 | Tanihara et al. | |
| 2017/0338472 | A1 | 11/2017 | Zhamu et al. | |
| 2017/0352874 | A1 | 12/2017 | Hosono et al. | |
| 2018/0212252 | A1 | 7/2018 | Dillard et al. | |
| 2018/0301737 | A1 | 10/2018 | Lee | |
| 2019/0088949 | A1 | 3/2019 | Makino et al. | |
| 2019/0123377 | A1 | 4/2019 | Yang et al. | |
| 2020/0136167 | A1* | 4/2020 | Park | H01M 4/662 |
| 2021/0057735 | A1 | 2/2021 | Kim et al. | |
| 2021/0151739 | A1 | 5/2021 | Nishiguchi et al. | |
| 2021/0242463 | A1 | 8/2021 | Kim et al. | |
| 2021/0320288 | A1 | 10/2021 | Althues et al. | |

FOREIGN PATENT DOCUMENTS

| | | | |
|---|---|---|---|
| CN | 112599724 | A | 4/2021 |
| CN | 113675362 | A | 11/2021 |
| EP | 0599603 | A1 | 6/1994 |
| EP | 4456202 | A1 | 10/2024 |
| JP | H09-147868 | A | 6/1997 |
| JP | H11-307086 | A | 11/1999 |
| JP | H11-307095 | A | 11/1999 |
| JP | 2001319642 | A | 11/2001 |
| JP | 2003-297342 | A | 10/2003 |
| JP | 2005-335203 | A | 12/2005 |
| JP | 2007-005747 | A | 1/2007 |
| JP | 2011048967 | A * | 3/2011 |
| JP | 2012-146395 | A | 8/2012 |
| JP | 5293383 | B2 | 9/2013 |
| JP | 2013229160 | A | 11/2013 |
| JP | 2014-078497 | A | 5/2014 |
| JP | 2017-098138 | A | 6/2017 |
| JP | 2019-129075 | A | 8/2019 |
| JP | 6914015 | B2 * | 8/2021 |
| JP | 2021521600 | A | 8/2021 |
| JP | 2021172572 | A | 11/2021 |
| KR | 10-1998-0028635 | A | 7/1998 |
| KR | 10-1999-0085953 | A | 12/1999 |
| KR | 10-2001-0003240 | A | 1/2001 |
| KR | 10-2001-0107374 | A | 12/2001 |
| KR | 10-0463437 | B1 | 12/2004 |
| KR | 10-2005-0052258 | A | 6/2005 |
| KR | 10-1181303 | B1 | 9/2012 |
| KR | 10-2013-0125919 | A | 11/2013 |
| KR | 10-1379716 | B1 | 3/2014 |
| KR | 10-2014-0058508 | A | 5/2014 |
| KR | 10-2014-0084840 | A | 7/2014 |
| KR | 10-2014-0091293 | A | 7/2014 |
| KR | 10-2015-0026098 | A | 3/2015 |
| KR | 10-2015-0067237 | A | 6/2015 |
| KR | 10-2015-0135961 | A | 12/2015 |
| KR | 10-2016-0031287 | A | 3/2016 |
| KR | 10-2016-0051610 | A | 5/2016 |
| KR | 10-2016-0075323 | A | 6/2016 |
| KR | 10-2016-0144756 | A | 12/2016 |
| KR | 10-2017-0025760 | A | 3/2017 |
| KR | 10-2017-0057953 | A | 5/2017 |
| KR | 10-1745974 | B1 | 6/2017 |
| KR | 10-2017-0086118 | A | 7/2017 |
| KR | 10-2018-0102406 | A | 9/2018 |
| KR | 10-2019-0020666 | A | 3/2019 |
| KR | 10-2019-0100152 | A | 8/2019 |
| KR | 10-2020-0003575 | A | 1/2020 |
| KR | 10-2020-0017340 | A | 2/2020 |
| KR | 10-2020-0020702 | A | 2/2020 |
| WO | 2013/005135 | A1 | 1/2013 |
| WO | 2017204027 | A1 | 11/2017 |
| WO | 2018/210723 | A1 | 11/2018 |
| WO | 2021028619 | A1 | 2/2021 |

* cited by examiner

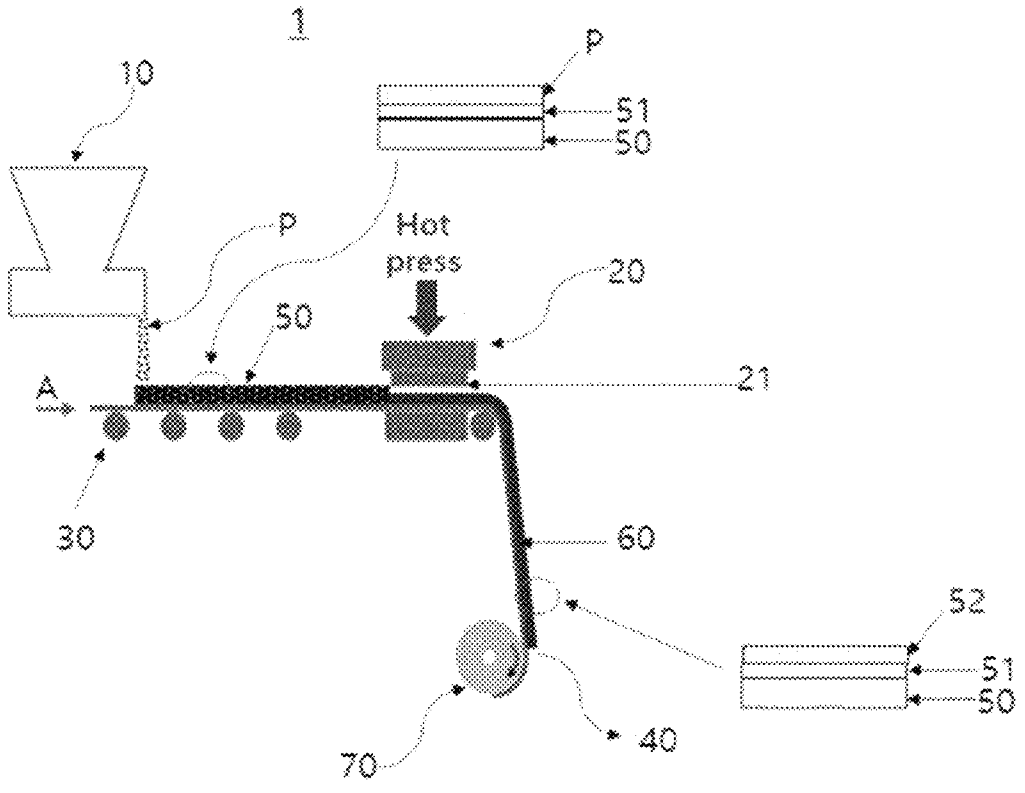
1
10
P
51
50
P
Hot press
50
20
21
A
30
60
52
51
50
70
40

APPARATUS AND METHOD FOR MANUFACTURING POSITIVE ELECTRODE, AND LITHIUM SECONDARY BATTERY COMPRISING THE POSITIVE ELECTRODE

This application is a National Stage Application of International Application No. PCT/KR2022/018935 filed on Nov. 28, 2022, and claims priority to Korean Patent Application No. 2021-0181006 filed on Dec. 16, 2021, the disclosures of which are incorporated herein by reference in their entirety.

FIELD OF DISCLOSURE

One aspect of the present disclosure relates to an apparatus and method for manufacturing a positive electrode for a lithium secondary battery.

BACKGROUND

Recently, with the rapid development in the field of electronic devices and electric vehicles, the demand for secondary batteries is increasing. In particular, with the trend toward miniaturization and weight reduction of portable electronic devices, there is growing a demand for secondary batteries having a high energy density that can cope with the trend.

Among the secondary batteries, a lithium-sulfur secondary battery is a secondary battery that uses sulfur-based compounds having a sulfur-sulfur bond as a positive electrode active material, and uses alkali metals such as lithium, carbon-based materials in which intercalation and deintercalation of metal ions such as lithium ions occur, or silicon or tin which forms an alloy with lithium, as a negative electrode active material. Specifically, in the case of the lithium-sulfur secondary battery, during the discharging which is a reduction reaction, as the sulfur-sulfur bond is cut off, the oxidation number of sulfur decreases, and during the charging which is an oxidation reaction, as the oxidation number of sulfur increases, the sulfur-sulfur bond is reformed. Through this oxidation-reduction reaction, electrical energy is stored and generated.

In particular, in the case of the lithium-sulfur secondary batteries, sulfur used as a positive electrode active material in the lithium-sulfur secondary batteries has a theoretical energy density of 1.675 mAh/g, which is a theoretical energy density of about five times higher than the positive electrode active material used in conventional lithium secondary batteries, and thus they are batteries capable of expressing high power and high energy density. In addition, since sulfur has the advantage of being cheap and rich in resources and thus being readily available and environmentally friendly, sulfur is drawing attention as an energy source not only for portable electronic devices but also for medium- and large-devices such as electric vehicles.

Since sulfur has an electrical conductivity of $5\times10^{-30}$ S/cm, which is a nonconductor without electrical conductivity, there is a problem that the movement of electrons generated by the electrochemical reaction is difficult. Accordingly, sulfur is compounded with an electrically conductive material such as carbon that can provide an electrochemical reaction site, and the sulfur-carbon composite produced thereby is used.

In order to use the sulfur-carbon composite as a positive electrode active material, a method of manufacturing a positive electrode through a slurry coating process, i.e., a wet process of preparing a slurry, together with an electrically conductive material and a binder, and then applying the slurry to a current collector is generally used.

However, the positive electrode manufactured by this wet process has a problem that the loading amount of the positive electrode active material in the positive electrode is lowered due to the electrically conductive material and the binder used in preparing the slurry, so that the energy density is reduced. Also, in the case of manufacturing the positive electrode by a wet process, there is a problem that additional costs are incurred due to mixing, coating, and drying processes, in addition to the problem due to the remaining moisture in the positive electrode.

On the other hand, in the case of manufacturing the positive electrode by a dry process, since the fiberization of the binder is essential, the type and content of the usable binder are limited. In addition, since this involves a premixing process of the positive electrode active material, the electrically conductive material, and the binder, and a milling process in which a high shear force is applied for fiberization of the binder, there is a problem that the process becomes complicated and cost and time are increased. In addition, there is a problem that the positive electrode active material and the electrically conductive material may be crushed by the high energy applied during the fiberization process of the binder.

In addition, the powder of the fiberized binder is generally molded through a calendar rolling process, and at this time, since the rotation speed of the roll and the nip distance variable affect the loading and porosity of the positive electrode at the same time, it may be difficult to independently adjust the conditions during the process for controlling the characteristics of the positive electrode to be manufactured.

Therefore, in the method of manufacturing a positive electrode by a dry process, it is necessary to develop a technology for manufacturing a positive electrode in a dry process without a binder, in order to prevent problems caused by the binder.

RELATED ARTS

Japanese Patent Application No. 2014-078497

SUMMARY

Accordingly, the inventors of one aspect of the present disclosure have conducted various studies to solve the above problems, and as a result, have confirmed that by configuring the positive electrode material feeding unit that feeds a positive electrode material in the form of a powder and the positive electrode material shaping unit that pressurizes it to operate independently, but simultaneously using pressure and temperature in the positive electrode material shaping unit, in the device for manufacturing a positive electrode through a dry process, it is possible to mold the positive electrode without using a binder, and it is easy to control the loading and porosity of the positive electrode during the manufacturing process of the positive electrode, and thus have completed one aspect of the present disclosure.

Therefore, it is an object of one aspect of the present disclosure to provide an apparatus and method for manufacturing a positive electrode for a lithium secondary battery by a dry process without using a binder.

In order to achieve the above object, one aspect of the present disclosure provides an apparatus for manufacturing a positive electrode for a lithium secondary battery, the apparatus including a positive electrode material feeding unit that feeds a positive electrode material in the form of a powder to one surface of a positive electrode current collector conveyed by conveying means; and a positive electrode material shaping unit that pressurizes the positive electrode current collector fed with the positive electrode material in the form of a powder, wherein the pressurization is performed using a mold in the shape of the positive electrode.

The positive electrode material feeding unit may include an ultrasonic sieve machine, a vibratory feeder, or a rotary feeder.

The positive electrode material shaping unit may pressurize at a temperature of 60 to 130° C. and a pressure of 0.2 MPa to 10 MPa using a hot press.

A primer coating layer including a binder may be formed on one surface of the positive electrode current collector.

The binder may include one or more selected from the group consisting of fluororesin-based binders comprising polyvinylidene fluoride (PVdF) or polytetrafluoroethylene (PTFE); rubber-based binders comprising styrene butadiene rubber (SBR), acrylonitrile-butadiene rubber, and styrene-isoprene rubber; cellulose-based binders comprising carboxymethylcellulose (CMC), starch, hydroxy propyl cellulose, and regenerated cellulose; polyalcohol-based binders; polyolefin-based binders comprising polyethylene and polypropylene; polyimide-based binders; polyester-based binders; and silane-based binders.

The positive electrode material in the form of a powder may include a sulfur-carbon composite composed of 50 to 90% by weight of sulfur and 10 to 50% by weight of a porous carbon material.

The apparatus for manufacturing the positive electrode for the lithium secondary may further comprise a positive electrode material recovery unit for conveying the positive electrode material in the form of a powder remaining on the positive electrode current collector, after being pressurized, by the positive electrode material shaping unit to the positive electrode material feeding unit.

In addition, one aspect of the present disclosure provides a method for manufacturing a positive electrode for a lithium secondary battery, comprising the steps of: (S1) feeding a positive electrode material in the form of a powder to one side of a positive electrode current collector conveyed by a conveying means; and (S2) pressurizing the positive electrode current collector fed with the positive electrode material in the form of a powder conveyed from the step (S1) by applying pressure in one direction using a mold having a shape of the positive electrode.

The method of one aspect of the present disclosure may further comprise, after step (S2), a step of (S3) recovering the positive electrode material in the form of a powder remaining on the positive electrode current collector after the pressurization of the step (S2) to the positive electrode material feeding unit.

The steps (S1) to (S2) above may be repeated twice, and the steps (S1) and (S2) above may be alternately performed.

According to one aspect of the present disclosure, a positive electrode can be manufactured by a dry process without using a binder by using an apparatus for manufacturing a positive electrode for a lithium secondary battery.

In addition, since the feeding unit for feeding the positive electrode material in the form of a powder and the shaping unit for shaping the positive electrode material for pressurizing it, which are provided in the manufacturing device of the positive electrode for the lithium secondary battery, are provided to operate independently, the loading amount of the positive electrode may be adjusted in the positive electrode material feeding unit and the porosity of the positive electrode may be adjusted in the positive electrode material shaping unit, and thus the loading amount and porosity of the positive electrode can be independently adjusted in the manufacturing process of the positive electrode.

In addition, since the pressurization is performed using the mold of the shape of the positive electrode in the positive electrode material shaping unit, the powder of the positive electrode material remaining without being pressurized can be recovered and used again.

BRIEF DESCRIPTION OF DRAWINGS

FIG. 1 is a schematic diagram of an apparatus for manufacturing a positive electrode for a lithium secondary battery according to an embodiment of one aspect of the present disclosure.

DETAILED DESCRIPTION

Hereinafter, the present disclosure will be described in more detail to help the understanding of the present disclosure.

The terms and words used in the present specification and claims should not be construed as limited to ordinary or dictionary terms, and should be construed in a sense and concept consistent with the technical idea of one aspect of the present disclosure, based on the principle that the inventor can properly define the concept of a term to describe his invention in the best way possible.

As used herein, the term “dry process” means a process that does not use a solvent.

Manufacturing Method of Positive Electrode for Lithium Secondary Battery

One aspect of the present disclosure relates to an apparatus for manufacturing a positive electrode for a lithium secondary battery, wherein the positive electrode is produced by a dry process while not using a binder in the manufacture of the positive electrode.

FIG. 1 is a schematic diagram of an apparatus for manufacturing a positive electrode for a lithium secondary battery according to an embodiment of one aspect of the present disclosure.

Referring to FIG. 1, the apparatus for manufacturing the positive electrode for the lithium secondary battery 1 includes the positive electrode material feeding unit 10 that feeds a positive electrode material P in the form of a powder to one surface of a positive electrode current collector 50 conveyed by a conveying means 30; and the positive electrode material shaping unit 20 that pressurizes the positive electrode current collector 50 fed with the positive electrode material P in the form of a powder, wherein the pressurization is performed using the mold 21 in the shape of the positive electrode, and the apparatus for manufacturing the positive electrode for the lithium secondary battery 1 may further include the positive electrode material recovery unit 40 for conveying the positive electrode material P in the form of a powder remaining on the positive electrode current collector 50, after being pressurized by the positive electrode material shaping unit 20, to the positive electrode material feeding unit 10.

In the apparatus for manufacturing the positive electrode for the lithium secondary battery 1 according to an embodiment of one aspect of the present disclosure, since a series of processes, in which the positive electrode current collector 50 conveyed in one direction by the conveying means 30 and at the same time, the positive electrode material P in the form of a powder is fed from the positive electrode material feeding unit 10, and then pressurized by the positive electrode material shaping unit 20 to produce a positive electrode 60, are performed as a continuous process, the process efficiency and productivity can be improved. The continuous process described above may also comprise a process of conveying the remaining positive electrode material P in the form of a powder to the positive electrode material feeding unit 10 by the positive electrode material recovery unit 40.

The conveying means 30 may enable the continuous process as described above by conveying the positive electrode current collector 50 and/or the positive electrode current collector 50 coated with the positive electrode material P in the form of a powder along a predetermined conveying path in one direction. For example, the conveying means 30 may form a conveying path for conveying the positive electrode current collector 50 in the direction of arrow A, and the conveying means 30 may sequentially pass through the positive electrode material feeding unit 10 and the positive electrode material shaping unit 20 at a constant speed under the control of the driving portion. As an example, the conveying means 30 is not particularly limited as long as it is a device capable of conveying a conveying object in the art. For example, the conveying means may be a device enabling a roll-to-roll process, and the roll-to-roll process may use an unwinder and a rewinder to convey the conveying means.

The positive electrode current collector 50 supports the positive electrode active material layer 52 and is not particularly limited as long as it has high electrical conductivity without causing chemical changes in the battery. For example, copper, stainless steel, aluminum, nickel, titanium, palladium, sintered carbon; copper or stainless-steel surface-treated with carbon, nickel, silver or the like; aluminum-cadmium alloy or the like may be used. In addition, the positive electrode current collector 50 can enhance the bonding strength with the positive electrode active material by having fine irregularities on its surface, and may be formed in various forms such as film, sheet, foil, mesh, net, porous body, foam, or nonwoven fabric.

In addition, a primer coating layer 51 comprising a binder and an electrically conductive material may be formed on the surface of the positive electrode current collector 50. The primer coating layer 51 may play a role in enabling the positive electrode material P in the form of a powder to better bind to the positive electrode current collector 50.

The binder is not particularly limited as long as it is a binder commonly used in the art. For example, the binder may be any one selected from fluororesin-based binders including polyvinylidene fluoride (PVdF) or polytetrafluoroethylene (PTFE); rubber-based binders including styrene butadiene rubber (SBR), acrylonitrile-butadiene rubber, and styrene-isoprene rubber; cellulose-based binders including carboxymethylcellulose (CMC), starch, hydroxy propyl cellulose, and regenerated cellulose; polyalcohol-based binders; polyolefin-based binders comprising polyethylene and polypropylene; polyimide-based binders; polyester-based binders; and silane-based binders, or mixtures or copolymers of two or more thereof.

In addition, the binder may be included in an amount of 10 to 30% by weight based on the total weight of the primer coating layer 51, and specifically, the content of the binder may be 10% by weight or more, 12% by weight or more, or 15% by weight or more, and may be 25% by weight or less, 28% by weight or less, or 30% by weight or less. If the content of the binder is less than 10% by weight, the adhesive strength of the positive electrode material P in the form of a powder to the positive electrode current collector 50 may be decreased. If the content of the binder exceeds 30% by weight, the performance and lifetime of the battery may be reduced by acting as resistance.

The electrically conductive material may play a role of imparting electrical conductivity to the positive electrode.

The electrically conductive material is not particularly limited as long as it can impart electrical conductivity to the positive electrode without causing chemical changes in the battery.

For example, as the electrically conductive material, graphite such as natural graphite and artificial graphite; carbon black such as acetylene black, Ketjen black, channel black, furnace black, lamp black, and thermal black; electrically conductive fibers such as carbon fiber and metal fiber; electrically conductive tubes such as carbon nanotubes; fluorocarbons; metal powders such as aluminum and nickel powder; electrically conductive whiskers such as zinc oxide and potassium titanate; electrically conductive metal oxides such as titanium oxide; or electrically conductive polymers such as polyphenylene derivatives may be used.

In addition, the electrically conductive material may be included in an amount of 70 to 90% by weight based on the total weight of the primer coating layer, and specifically, the content of the electrically conductive material may be 70% by weight or more, 72% by weight or more, or 75% by weight or more, and may be 85% by weight or less, 88% by weight or less, or 90% by weight or less. If the content of the electrically conductive material is less than 70% by weight, the content of the binder in the primer coating layer is relatively high, and the primer coating layer acts as a resistance layer, and thus the performance and lifetime of the battery may be deteriorated, and the electrical conductivity of the positive electrode may be deteriorated. If the content of the electrically conductive material exceeds 90% by weight, the content of the binder is relatively small, and thus formability may be deteriorated.

The primer coating layer 51 may be formed by adding the binder and the electrically conductive material to a solvent and then applying it to one surface or both surfaces of the positive electrode current collector 50.

In this case, water or an organic solvent may be used as the solvent. If the binder is an aqueous binder, water may be used as the solvent. If the binder is a non-aqueous binder, an organic solvent may be used.

The organic solvent is not particularly limited as long as it is commonly used in the art. For example, the organic solvent may comprise one or more selected from the group consisting of propylene carbonate (PC), ethylene carbonate (EC), diethyl carbonate (DEC), dimethyl carbonate (DMC), ethylmethyl carbonate (EMC), methylpropyl carbonate, dipropyl carbonate, tetraethylene glycol dimethyl ether (TEGDME), dioxolane (DOL), dimethylsulfuroxide, acetonitrile, dimethoxyethane, diethoxyethane, vinylene carbonate, sulfolane, gamma-butyrolactone, propylene sulfite, and tetrahydrofuran, and a mixture of two or more of them, and the like.

In one aspect of the present disclosure, the positive electrode material P in the form of a powder includes a sulfur-carbon composite composed of 50% by weight to 90% by weight of sulfur and 10% by weight to 50% by weight of a porous carbon material.

In addition, the positive electrode material in the form of a powder includes the sulfur-carbon composite in an amount of 90 to 100% by weight, preferably 95 to 100% by weight, and more preferably 97 to 100% by weight, based on the total weight of the positive electrode material.

The sulfur-carbon composite means a form in which the sulfur is supported in the porous carbon material. For example, the sulfur-carbon composite may be in a state in which sulfur is attached or coated on the surface of the porous carbon material. In addition, the sulfur-carbon composite may be in a state in which the sulfur is attached to, filled in, or coated to internal pores of the porous carbon material; or the sulfur is infiltrated and attached to the inside of the porous carbon material.

That is, the lithium secondary battery according to one aspect of the present disclosure may be a lithium-sulfur secondary battery comprising the sulfur-carbon composite in a positive electrode material.

The positive electrode material feeding unit 10 is for feeding the positive electrode material P in the form of a powder to one surface of a positive electrode current collector 50 conveyed by the conveying means 30, and is not particularly limited in its configuration, device and the like. For example, the positive electrode material feeding unit 10 may comprise an ultrasonic sieve machine, a vibratory feeder, or a rotary feeder to remove coarse particles from the positive electrode material P in the form of a powder.

Also, in the positive electrode material feeding unit 10, not only can the loading amount of the positive electrode material P in the form of a powder be easily adjusted to suit the purpose, but also the deviation of the loading amount can be improved, and thus the loading amount of the finally manufactured positive electrode can be easily adjusted according to the application and the reliability of the manufacturing process can be improved.

The positive electrode material shaping unit 20 is for applying pressure to and shaping the positive electrode material P in the form of powder fed to the one surface of the positive electrode current collector 50 while passing through the positive electrode material feeding unit 10, and is not particularly limited in its configuration, device and the like. For example, the positive electrode material shaping unit 20 may include a hot press capable of applying both temperature and pressure. In this case, the pressure may be applied from the upper direction of the positive electrode material P in the form of powder fed to the one surface of the positive electrode current collector 50 by the hot press.

The positive electrode material shaping unit 20 may be pressurized at a temperature of 60° C. to 130° C. and a pressure of 0.2 MPa to 10 MPa using the hot press. The adhesive strength between the positive electrode material P in the form of powder and the positive electrode current collector 50 can be further improved by not only applying pressure in the positive electrode material shaping unit 20, but also heating it at the same time.

Specifically, the temperature applied by the hot press may be 60° C. or higher, 70° C. or higher, or 80° C. or higher, and may be 110° C. or lower, 120° C. or lower, or 130° C. or lower. If the temperature is less than 60° C., the effect of improving the adhesive strength between the positive electrode material P in the form of powder and the positive electrode current collector 50 may be insignificant. If the temperature exceeds 130° C., the powder melts and thus the formability may be deteriorated.

In addition, the pressure applied by the hot press may be 0.2 MPa or more, 0.5 MPa or more, or 1 MPa or more, and may be 8 MPa or less, 9 MPa or less, or 10 MPa or less. If the pressure is less than 0.2 MPa, the positive electrode material P in the form of powder is not sufficiently rolled, and thus the positive electrode may not be formed or the porosity of the positive electrode may be excessively increased, thereby resulting in a decrease in durability. If the pressure exceeds 10 MPa, the rolling becomes excessive, and thus there may be a problem in the performance of the cell, and the porosity may be excessively reduced, or the particles of the positive electrode material may be destroyed.

Also, in the positive electrode material shaping unit 20, the pressure may be applied using the mold 21 having a shape of the positive electrode. Since the specifications such as the size and shape of the positive electrode are prescribed before the manufacturing process of the positive electrode, if the pressure is applied using the mold 21 having the shape of the positive electrode manufactured according to the prescribed specifications, the pressure-applied part can be obtained as a positive electrode.

For example, the positive electrode material shaping unit 20 protrudes convexly in one direction and includes a portion that directly contacts the positive electrode material, and the rolled portion of the positive electrode material shaping unit 20 by applying pressure may be molded into the shape of a positive electrode and at the same time, adhered to the primer coating layer 51. Also, after shaping, the remaining positive electrode material may be recovered into the positive electrode material feeding unit 10 and reused.

Thereafter, a process of notching the positive electrode current collector into the shape of a positive electrode may be additionally performed.

The positive electrode material recovery unit 40 may recover the positive electrode material P in the form of powder from the positive electrode current collector 50 into the positive electrode material feeding unit 10, in order to reuse the positive electrode material P in the form of powder remaining on the positive electrode current collector 50, after the process of applying pressure from the positive electrode material shaping unit 20 is completed.

The positive electrode material recovery unit 40 is not particularly limited as long as it is a device capable of recovering the powder having almost no adhesive strength. For example, the positive electrode material recovery unit 40 may be a scraper, an air gun or the like.

In addition, the positive electrode material recovery unit 40 may be mounted at a corresponding position before the positive electrode manufactured by passing through the positive electrode material shaping unit 30 is wound around the winding roll 70.

In addition, the positive electrode manufactured by passing through the positive electrode material shaping unit 20 may be wound around the winding roll 70.

Manufacturing Method of Positive Electrode for Lithium Secondary Battery

One aspect of the present disclosure relates to a method for manufacturing a positive electrode for the lithium secondary battery, which includes the steps of (S1) feeding a positive electrode material in the form of a powder to one surface of a positive electrode current collector conveyed by a conveying means; and (S2) pressurizing the positive electrode current collector fed with the positive electrode material in the form of a powder conveyed from the step (S1) by applying pressure in one direction using a mold having a shape of the positive electrode, and may further include (S3) recovering the positive electrode material in the form of a powder remaining on the positive electrode current collector after the pressurization to the positive electrode material feeding unit.

Hereinafter, the method for manufacturing the positive electrode for the lithium secondary battery according to an embodiment of the present disclosure will be described in detail for each step.

In step (S1) of the method for manufacturing a positive electrode for a lithium secondary battery according to an embodiment of one aspect of the present disclosure, the positive electrode material in the form of a powder can be fed to the one surface of the positive electrode current collector conveyed by the conveying means.

Step (S1) is performed in the positive electrode material feeding unit as described above, and the contents of the conveying means, the positive electrode current collector, and the positive electrode material in the form of a powder are as described above.

In step (S2) of the method for manufacturing a positive electrode for a lithium secondary battery according to an embodiment of one aspect of the present disclosure, the positive electrode current collector conveyed in step (S1) and fed with the positive electrode material in the form of a powder may be pressurized by applying pressure in one direction using the mold having the shape of a positive electrode.

Step (S2) is performed in the positive electrode material shaping unit as described above, and the contents of the device provided in the positive electrode material shaping unit, the temperature and pressure conditions, and the mold are as described above.

In step (S3) of the method for manufacturing a positive electrode for a lithium secondary battery according to an embodiment of one aspect of the present disclosure, the positive electrode material in the form of a powder remaining on the positive electrode current collector after the pressurization may be recovered to the positive electrode material feeding unit.

Step (S3) is performed using a positive electrode material recovery unit, and the contents of the positive electrode material recovery unit are as described above.

In the method for manufacturing the positive electrode for the lithium secondary battery according to an embodiment of one aspect of the present disclosure, the steps (S1) to (S2) above may be repeated twice, and the steps (S1) and (S2) above are alternately performed.

After the steps (S1) and (S2) above are performed once, a positive electrode having a positive electrode active material layer formed on the one surface of the positive electrode current collector can be manufactured.

Thereafter, the steps (S1) to (S2) above are repeated twice in total by performing the steps (S1) and (S2) once more, and thus a positive electrode having a positive electrode active material layer formed on both surfaces of the positive electrode current collector can be manufactured.

Alternatively, after configuring the positive electrode material feeding unit and the positive electrode material shaping unit in two layers, the positive electrode material may be simultaneously fed to both surfaces of the positive electrode current collector, thereby manufacturing, at once, a positive electrode having a positive electrode active material layer formed on both surfaces. In this case, the positive electrode active material layer on the upper surface of the positive electrode current collector may be formed in the same manner as in steps (S1) and (S2) above, and the positive electrode active material layer on the lower surface of the positive electrode current collector may be formed by conveying a foil instead of the positive electrode current collector and then transferring it to the positive electrode current collector in the positive electrode material shaping unit. That is, the positive electrode material in the form of a powder is not separately fed from the positive electrode material feeding unit to the lower surface of the positive electrode current collector, and the positive electrode material is transferred in the form of a foil.

DESCRIPTION OF REFERENCE NUMERALS

1: Apparatus for manufacturing positive electrode for lithium secondary battery
10: Positive electrode material feeding unit
20: Positive electrode material shaping unit
21: Mold
30: Conveying means
40: Positive electrode material recovery unit
50: Positive electrode current collector
51: Primer coating layer
52: Positive electrode active material layer
60: Positive electrode
70: Winding roll
P: Positive electrode material in the form of powder

The invention claimed is:

1. An apparatus for manufacturing a positive electrode for a lithium secondary battery, the apparatus comprising:

a positive electrode material feeding unit that feeds a positive electrode material in the form of a powder to one surface of a positive electrode current collector while the positive electrode current collector is being conveyed by conveying means; and a positive electrode material shaping unit that heats and pressurizes the positive electrode current collector fed with the positive electrode material in the form of a powder, wherein the pressurization is performed using a mold having a shape of the positive electrode.

2. The apparatus according to claim 1, wherein the positive electrode material feeding unit comprises an ultrasonic sieve machine, a vibratory feeder, or a rotary feeder.

3. The apparatus according to claim 1, wherein the positive electrode material shaping unit pressurizes at a temperature of 60 to 130° C. and a pressure of 0.2 MPa to 10 MPa using a hot press.

4. The apparatus according to claim 1, wherein a primer coating layer comprising a binder is formed on the one surface of the positive electrode current collector.

5. The apparatus according to claim 4, wherein the binder comprises one or more selected from the group consisting of fluororesin-based binders comprising polyvinylidene fluoride (PVdF) or polytetrafluoroethylene (PTFE); rubber-based binders comprising styrene butadiene rubber (SBR), acrylonitrile-butadiene rubber, and styrene-isoprene rubber; cellulose-based binders comprising carboxymethylcellulose (CMC), starch, hydroxy propyl cellulose, and regenerated cellulose; polyalcohol-based binders; polyolefin-based binders comprising polyethylene and polypropylene; polyimide-based binders; polyester-based binders; and silane-based binders.

6. The apparatus according to claim 1, wherein the positive electrode material in the form of a powder comprises a sulfur-carbon composite composed of 50 to 90% by weight of sulfur and 10 to 50% by weight of a porous carbon material.

7. The apparatus according to claim 1, wherein the apparatus further comprises a positive electrode material recovery unit which conveys the positive electrode material in the form of a powder remaining on the positive electrode current collector, after the pressurization by the positive electrode material shaping unit, to the positive electrode material feeding unit.

8. A method for manufacturing a positive electrode for a lithium secondary battery, the method comprising:

(S1) feeding a positive electrode material in the form of a powder to one surface of a positive electrode current collector while the positive electrode current collector is being conveyed by a conveying means; and (S2) pressurizing the positive electrode current collector fed with the positive electrode material in the form of a powder conveyed from the step (S1) by applying pressure in one direction using a mold having a shape of the positive electrode.

9. The method according to claim 8, wherein the method further comprises (S3) recovering the positive electrode material in the form of a powder remaining on the positive electrode current collector after the pressurization of the step (S2) to the positive electrode material feeding unit.

10. The method according to claim 8, wherein the steps (S1) to (S2) are repeated twice, and the steps (S1) and (S2) are performed alternately.

* * * * *